United States Patent
Carter et al.

(10) Patent No.: US 8,015,301 B2
(45) Date of Patent: Sep. 6, 2011

(54) POLICY AND ATTRIBUTE BASED ACCESS TO A RESOURCE

(75) Inventors: Stephen R Carter, Spanish Fork, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 1516 days.

(21) Appl. No.: 10/676,231

(22) Filed: Sep. 30, 2003

(65) Prior Publication Data

US 2005/0068983 A1    Mar. 31, 2005

(51) Int. Cl.
  *G06F 15/16*    (2006.01)
(52) U.S. Cl. ............................... 709/229; 726/4
(58) Field of Classification Search .......... 709/227–229; 726/4, 5
  See application file for complete search history.

(56) References Cited

U.S. PATENT DOCUMENTS

| | | | |
|---|---|---|---|
| 5,544,322 A | 8/1996 | Cheng et al. | |
| 5,560,008 A | 9/1996 | Johnson et al. | 395/650 |
| 5,706,427 A | 1/1998 | Tabuki | 713/201 |
| 5,737,523 A | 4/1998 | Callaghan et al. | |
| 5,774,551 A * | 6/1998 | Wu et al. | 713/155 |
| 5,787,175 A | 7/1998 | Carter | |
| 5,818,936 A | 10/1998 | Mashayekhi | 380/25 |
| 5,841,970 A | 11/1998 | Tabuki | 395/187.01 |
| 5,848,232 A | 12/1998 | Lermuzeaux et al. | |
| 5,913,025 A | 6/1999 | Higley et al. | 395/187.01 |
| 5,933,498 A | 8/1999 | Schneck et al. | |
| 5,999,711 A | 12/1999 | Misra et al. | |
| 6,014,135 A | 1/2000 | Fernandes | |
| 6,072,875 A * | 6/2000 | Tsudik | 380/270 |
| 6,088,451 A | 7/2000 | He et al. | |
| 6,092,199 A | 7/2000 | Dutcher et al. | |
| 6,108,788 A | 8/2000 | Moses et al. | |
| 6,119,230 A | 9/2000 | Carter | |
| 6,230,271 B1 | 5/2001 | Wadlow et al. | |
| 6,263,446 B1 | 7/2001 | Kausik et al. | |
| 6,314,409 B2 | 11/2001 | Schneck et al. | |
| 6,343,361 B1 | 1/2002 | Nendell et al. | |
| 6,377,692 B1 | 4/2002 | Takahashi et al. | |
| 6,430,575 B1 | 8/2002 | Dourish et al. | |
| 6,515,316 B1 | 2/2003 | Wojtowicz et al. | |
| 6,539,482 B1 | 3/2003 | Blanco et al. | 713/201 |

(Continued)

FOREIGN PATENT DOCUMENTS

WO    WO-0079432 A1    12/2000

OTHER PUBLICATIONS

"EP Search Report", in related matter EP 04104137.7, (Mar. 1, 2005), 9 pgs.

(Continued)

*Primary Examiner* — Douglas B Blair
(74) *Attorney, Agent, or Firm* — Schwegman, Lundberg & Woessner, P.A.

(57) ABSTRACT

Techniques are provided for controlling access to a resource based on access policies and attributes. A principal issues a request to a service for purposes of accessing a resource. The principal is authenticated and a service contract for the principal, the service, and the resource is generated. The service contract defines resource access policies and attributes which can be permissibly performed by the service on behalf of the principal during a session. Moreover, the session between the service and the resource is controlled by the service contract.

14 Claims, 4 Drawing Sheets

U.S. PATENT DOCUMENTS

| | | |
|---|---|---|
| 6,718,470 B1 | 4/2004 | Adams |
| 6,891,953 B1 | 5/2005 | DeMello et al. |
| 6,911,974 B2 | 6/2005 | Asano et al. |
| 6,957,261 B2 | 10/2005 | Lortz |
| 6,981,262 B1 | 12/2005 | DeMello et al. |
| 7,088,822 B2 | 8/2006 | Asano |
| 7,146,635 B2 * | 12/2006 | Eggebraaten et al. ............ 726/4 |
| 7,167,564 B2 | 1/2007 | Asano et al. |
| 7,203,968 B2 | 4/2007 | Asano et al. |
| 7,224,804 B2 | 5/2007 | Ishiguro et al. |
| 7,237,256 B2 * | 6/2007 | Cheng et al. ....................... 726/3 |
| 7,299,493 B1 | 11/2007 | Burch et al. |
| 7,319,752 B2 | 1/2008 | Asano et al. |
| 7,320,074 B2 * | 1/2008 | Eggebraaten et al. ........ 713/182 |
| 7,346,170 B2 | 3/2008 | Asano et al. |
| 7,391,865 B2 * | 6/2008 | Orsini et al. ................. 380/201 |
| 7,467,415 B2 | 12/2008 | Carter |
| 7,487,233 B2 * | 2/2009 | Iwamoto et al. ............. 709/223 |
| 7,552,468 B2 | 6/2009 | Burch et al. |
| 7,610,390 B2 * | 10/2009 | Yared et al. .................. 709/229 |
| 7,702,739 B1 * | 4/2010 | Cheng et al. ................. 709/207 |
| 7,849,204 B2 * | 12/2010 | Yared et al. .................. 709/229 |
| 2001/0034841 A1 | 10/2001 | Shambroom |
| 2002/0052798 A1 | 5/2002 | Nishikado et al. |
| 2002/0095571 A1 | 7/2002 | Bradee |
| 2003/0002521 A1 | 1/2003 | Traversat et al. |
| 2003/0014631 A1 | 1/2003 | Sprague |
| 2003/0023880 A1 | 1/2003 | Edwards et al. ............. 713/201 |
| 2003/0061144 A1 | 3/2003 | Brickell et al. |
| 2003/0172034 A1 | 9/2003 | Schneck et al. |
| 2003/0172090 A1 * | 9/2003 | Asunmaa et al. ............. 707/200 |
| 2004/0128378 A1 | 7/2004 | Blakley, III et al. |
| 2004/0187031 A1 | 9/2004 | Liddle |
| 2004/0210771 A1 | 10/2004 | Wood et al. |
| 2005/0097056 A1 | 5/2005 | DeMello et al. |
| 2005/0120199 A1 | 6/2005 | Carter |
| 2006/0020549 A1 | 1/2006 | Stransky |
| 2006/0075473 A1 * | 4/2006 | Moreh et al. ....................... 726/5 |
| 2006/0080529 A1 | 4/2006 | Yoon et al. |
| 2006/0178997 A1 | 8/2006 | Schneck et al. |
| 2007/0143398 A1 | 6/2007 | Graham |
| 2007/0156659 A1 | 7/2007 | Lim |
| 2007/0156670 A1 | 7/2007 | Lim |
| 2007/0156694 A1 | 7/2007 | Lim |
| 2007/0294750 A1 | 12/2007 | Burch et al. |
| 2008/0134286 A1 * | 6/2008 | Amdur et al. ..................... 726/1 |

OTHER PUBLICATIONS

Aarts, Robert, et al., "Liberty ID-FF Bindings and Profiles Specification", *Liberty Alliance Project, Version 1.2*, (2003),1-61.

Aarts, Robert, et al., "Liberty ID-FF Protocols and Schema Specification", *Liberty Alliance Project, Version 1.2*, (2003),1-46.

Hodges, Jeff, et al., "Oasis SSTC: SAML Security Considerations", *Internet Article, 'Online!*, www.oasis-open.org, retrieved Feb. 7, 2005, Sections 5.2.1.1 and 5.4.2, XP002316601,(Nov. 14, 2001),1-22.

Madsen, Paul, et al., "Liberty Metadata Description and Discovery Specification", *Liberty Alliance Project, Version 1.0*, (2003),1-33.

"U.S. Appl. No. 10/765,523, Response filed Jul. 6, 2007 to Non-Final Office Action mailed May 17, 2007", 7 pgs.

"U.S. Appl. No. 10/765,523, Non-Final Office Action mailed May 17, 2007", 14 pgs.

"U.S. Appl. No. 10/765,523 Notice of Allowance mailed Sep. 25, 2007", 6 pgs.

"U.S. Appl. No. 10/813,505 Non-Final Office Action mailed Apr. 1, 2008", OARN,17pgs.

Rowley, Andrew , "A Security Architecture for Distributed Groupware", *Department of Computer Science*, University of London, (Sep. 1998),142 pgs.

* cited by examiner

POLICY AND ATTRIBUTE BASED ACCESS TO A RESOURCE

FIELD OF THE INVENTION

The invention relates generally to network security, and more specifically to techniques for controlling access to a resource based on policies and attributes.

BACKGROUND OF THE INVENTION

Securing personal information of users and organizations is of paramount concern in today's highly connected society. More frequently, transactions that would typically be performed manually or in person are occurring over electronic networks with near instantaneous speed. These transactions are healthy for a twenty-first century economy, since the physical locations of the participants and the time of these transactions become of little import. As a result, the electronic transactions have made world economies more diverse (inclusive), more efficient and arguably they have increased the quality of life for the participants.

Unfortunately, this transformation of the world economy is not without problems. For example, in order to ensure the authenticity of any particular transaction, participants are often required to provide confidential information during the transaction in order to uniquely identity themselves. As a result, a wealth of confidential information about participants is continuously electronically collected, stored, and transmitted over electronic networks. Moreover, each time such information is electronically accessed or transmitted in some manner it becomes vulnerable to potential malicious interception. In other words, each time the confidential information is electronically needed for a transaction that confidential information may be potentially compromised in some manner. As another example, the confidential information can also be compromised at a vendor's storage location. This may occur as a result of either intentional or unintentional conduct on the part of the vendor.

Further, if malicious interception or access occurs, then the identity of a participant can be altered or used electronically to perform bogus transactions. For example, if a credit card number is intercepted along with its expiration date, then the interceptor can purchase items over the Internet pretending to be the credit card debtor. Still further, if a Social Security Number (SSN) is intercepted, the interceptor can use the SSN to apply for credit in the name of the person associated with the SSN, or electronically access that person's bank accounts. The potential for misusing confidential information is nearly infinite.

Not surprisingly, organizations that perform electronic transactions have developed a variety of techniques to control electronic access and transmission of confidential information. One popular technique is to house the confidential information in a protected data store and only permit authorized electronic applications to access the data store. Thus, a participant to a transaction authenticates to an authorized application and then, that application accesses the confidential information in the protected data store on behalf of the participant.

However, these conventional techniques assume that the authorized application has not itself been malicious tampered with or that the authorized application is not acting on behalf of a bogus participant. Moreover, most conventional techniques will interface an authorized application to another access application. This other access application has direct access to the confidential information residing in the protected data store. Furthermore, the access application is generally not restricted in terms of what operations it may perform against the protected data store. Therefore, once a malicious user of an authorized application discovers that an access application has unfettered access to the protected data store; instructions can be issued within the authorized application to perform unauthorized transactions against the protected data store by maliciously using the unfettered access rights of the access application.

Thus, improved techniques for accessing confidential information are needed.

SUMMARY OF THE INVENTION

In various embodiments of the invention, techniques are presented for controlling access to a resource based on access policies and attributes. A principal uses a service for purposes of gaining access to a resource. The principal is authenticated and a service contract is generated for the principal, the service and the resource. The service establishes a session with the resource. The session is controlled by the service contract, where the service contract includes selective resource access policies and attributes which can be permissibly performed by the service against the resource during the session.

More specifically, and in one embodiment of the invention, a method for enforcing policy and attribute based access to a resource is presented. Initially, a principal is interacted with for purposes of acquiring identity information from the principal and authenticating the principal. Next, an identity configuration for the principal is assembled. Then, a service contract is generated for the principal, the service, and the resource. Moreover, the service contract includes a selective number of resource access policies and attributes which are included within the identity configuration. The principal uses the service to indirectly access the resource. Finally, an access statement is transmitted to the principal for use by the principal when interacting with the service.

In another embodiment of the invention, another method for enforcing policy and attribute based access to a resource is described. A session request is received for purposes of accessing a resource. The session request is sent from a service and includes alias identity information for a principal. The alias identity information is mapped to principal identity information, and the principal identity information is authenticated. Next, a service contract for the principal, the service, and the resource is acquired. The service contract includes selective resource access policies and attributes which are permissibly used by the service against the resource on behalf of the principal. Then, a session is established between the service and the resource, where the session is controlled by the service contract.

In still another embodiment of the invention, a policy and attribute based resource access system is presented. The policy and attribute based resource access system includes an identity authenticator, an identity configuration aggregator, and a resource session administrator. The identity authenticator authenticates a principal for access to a resource and generates a service contract for the principal, the resource, and a service. The identity configuration aggregator generates an identity configuration for the principal and the resource. The service contract defines selective resource access policies and attributes from the identity configuration. The resource session administrator establishes a session with the service and ensures that access attempts made by the service during the session conform to the service contract.

In yet another embodiment of the invention, a policy and attribute based resource session manager is described. The policy and attribute based resource session manager includes instructions residing in a computer-accessible medium. The instructions when executed perform a method that receives alias identity information from a service. The alias identity information is associated with a principal. A request is made to acquire a mapping from the alias identity information to principal identity information. The principal identity information is then authenticated. A service contract is requested for the principal, the service and a resource. The service contract includes selective resource access policies and attributes derived from an identity configuration. Next, a session is established between the service and the resource, where the session is controlled by the service contract.

DETAILED DESCRIPTION OF THE INVENTION

Figure 1:
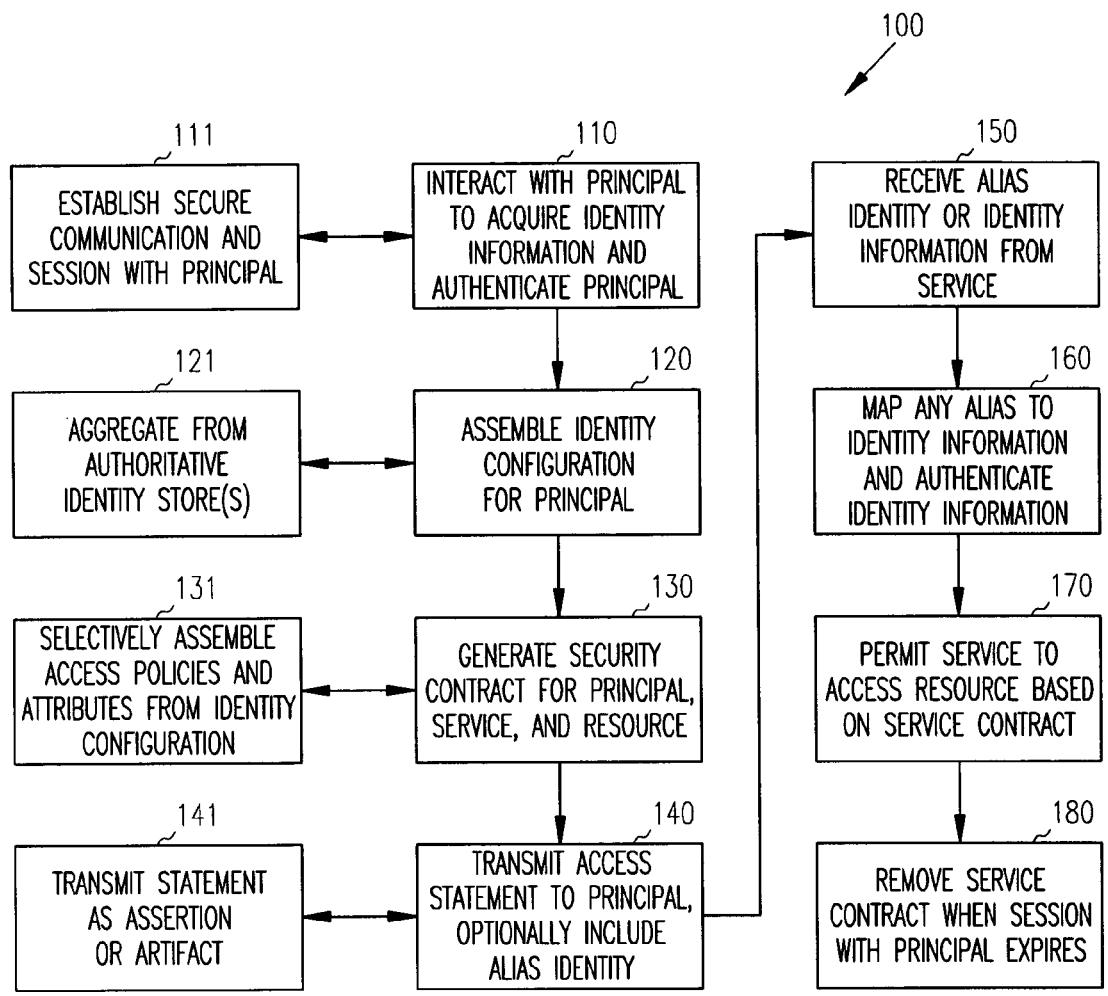
FIG. 1 is a flowchart representing a method for enforcing policy and attribute based access to a resource.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the term "principal" is used. A principal is an electronic representation of a user or an application. In one embodiment, the term principal is consistent with how that term is generally understood in the security arts.

For example, the term principal can be used in the context of Security Assertion Markup Language (SAML) which is an extension of the Extensible Markup Language (XML). SAML is used for securely processing assertions about a user or application (principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

A SAML encoded statement includes an assertion, a protocol, and a binding. There are generally three types of assertions: an authentication assertion used to validate a principal's electronic identity, an attribute assertion that includes specific attributes about the principal, an authorization assertion that identifies what the principal is permitted to do (e.g., policies). The protocol defines how a SAML processing application will ask for and receive the assertions. The binding defines how SAML message exchanges are mapped to Simple Object Access Protocol (SOAP) exchanges, or other protocol exchanges.

In general terms, SAML techniques improve security between business-two-business (B2B) electronic transactions and business-two-customer (B2C) electronic transactions. The techniques permit one principal to log in with a single transaction to a receiving principal and then use a variety of the receiving principal's disparate services by providing the SAML statements when needed. SAML techniques are supported with a variety of network protocols, such as Hypertext Transfer Protocol (HTTP), Simple Mail Transfer Protocol (SMTP), File Transfer Protocol (FTP), SOAP, BizTalk, and Electronic Business XML (ebXML). The Organization for the Advancement of Structured Information Standards (OASIS) is the standards group for SAML. The techniques of Liberty are enhancements to the SAML techniques and may also be used in connection with various embodiments of this invention.

However, it is to be understood that SAML and Liberty techniques are not needed to perform the teachings of all embodiments of the invention. These techniques complement some embodiments of this invention. In this sense, the integration of SAML and Liberty techniques with some of the embodiments presented herein is intended to be part of certain aspects of this invention, but not all embodiments of this invention are dependent on SAML or Liberty technology.

In a similar manner there are various other existing authentication techniques that may be practiced in connection with some embodiments of this invention. But, once again these other authentication techniques are not necessary for realizing the benefits of all embodiments of the invention. Some of these techniques include Public Key Infrastructure (PKI) techniques including public-private key pairs, digital certificates, biometric authentication, or use of conventional identifications and passwords.

The term "resource" as used herein refers to an electronic entity, an application, a data store, a directory, or a set of applications or data stores that cooperate for purposes of controlling direct access to confidential information. Thus, the resource is accessed for performing some operation (e.g., read or write) on the confidential information. Confidential information includes secure data about a principal, such as SSN, name, address, phone number, e-mail address, Internet Protocol (IP) address, bank account number, password, password secrets for obtain the password (mother's maiden name, name of pet, etc.), password, birth date, name of spouse, number of children, salary, employer, and the like.

Access policies refer to allowance or disallowance operations (e.g., reads, writes, creates, deletes) that can be performed on specific attributes. Attributes refer to specific secure data (data field names defined in the resource for the confidential information).

A service is an application or system that a principal uses for gaining access to a resource. A proxy server is a suite of applications, a system, or a single application that intercepts and processes resource-access requests and establishes sessions between a service and a resource. The proxy server acts as an intermediary for transactions occurring among the principal, the service, and the resource. One embodiment of this invention is implemented within proxy server products distributed by Novell, Inc., of Provo, Utah.

Of course, the embodiments of the invention can be implemented in a variety of architectural platforms. For example, the functional aspects of the proxy server presented herein can be integrated within modified services. Alternatively, portions of some functional aspects of the proxy server can be integrated within modified services or integrated with other systems that are independent of a proxy server, a resource, or a service as defined herein. Correspondingly, the architectural layout of the techniques presented with embodiments of the invention can be altered and still fall within the scope of the invention, when any such architectural layout performs the teachings or the functional equivalent of those teachings which are recited in the attached claims.

FIG. 1 is a flowchart representing one method 100 for enforcing policy and attributed based access to a resource. The method 100 is implemented as one or more applications residing in a computer-accessible medium. In one embodiment, the method 100 is implemented as a proxy server. The method 100 need not be in operation, but when the method 100 is operational it performs the following techniques for enforcing policy and attribute based access to a resource.

Initially, a principal desires to access a resource, where access to that resource is restricted to a service. Accordingly, in one embodiment, the principal accesses a World-Wide Web (WWW) browser application over the Internet to log into the service. This generates a request from the principal for the service. A Hypertext Transfer Protocol (HTTP) proxy, who acts as a filtering proxy or intermediary to the service, intercepts the request (alternatively the request is unknowingly directed to the HTTP proxy by the browser application on behalf of the principal). The HTTP proxy determines that the principal needs to be authenticated before the principal can be permitted access to the service.

Continuing with the description of the present embodiment, the HTTP proxy redirects communications of the WWW browser application to the processing depicted in FIG. 1 (hereinafter referred to as "the processing"). Accordingly, at 110, an interaction and an active principal session are established between the processing and the principal via the browser application. In one embodiment, this interaction occurs over a secure communication channel, at 111 (e.g., HTTP using a Secure Socket Layer (HTTPS)). During this interaction, the principal may be presented with a log in screen to provide identity information (e.g., the principal's identification and password). Alternatively, during this interaction the WWW browser application can automatically acquire principal identity information from the principal's computing environment (e.g., by using WWW cookies).

In one embodiment, the redirection from the HTTP proxy back to the principal's WWW browser includes a SAML statement, which is communicated by the WWW browser application back to the processing. This SAML statement specifies the processing on how to perform authentication on the principal based on the required identity information needed by the service. In some cases, the identity information can be more complex and include advanced information related to digital certificates, biometric values, hardware configuration values, network configuration values, smart card information, Internet Protocol (IP) addresses, IP subnet information, time of day values, calendar values, and the like.

In an alternative embodiment, the principal directs an access request to a service that has access to a desired resource. The service includes its own redirection instructions and/or SAML interface, to force a redirection of the access request back to an application that the principal is using to connect with the service. This forces the principal's application to interact with the processing for purposes of initially authenticating the principal to the service. Thereafter, the processing interacts with the principal's application for purposes of authenticating the principal in a similar manner as was described above with the first embodiment description.

While the processing interacts with the principal to acquire the proper identity information from the principal for authenticating to the service, the identity information is used for authenticating the principal for access to the service. Moreover, even after authentication occurs a session may be maintained between the processing and the principal. Thus, any additional attributes associated with the principal that may be useful to the method 100 can also be collected from the principal after authentication is properly achieved.

At this point, the identity information provided by the principal is used for assembling an aggregated identity configuration for the principal, as depicted at 120. The identity configuration represents aggregated access policies and attributes associated with the principal vis-à-vis the resource and all known services available to the principal. In one embodiment, the aggregated identity configuration is assembled by indexing the principal's identity information into one or more authoritative identity stores at 121. The authoritative identity stores can be secure and accessible only via the processing.

Next, at 130, a security contract is generated for the principal; the principal's desired service, and the resource. The phrase "service contract" as used herein and below refers to the security strictures that exist for the tripartite relationship of the principal; the principal's desired service, and the resource that the principal desires access to. It is noted that each of the three participants to the security contract can have their own individual contracts, but herein and below the security contract refers to the combined contract that is established for the relationship between the three parties.

At 131, the security contract is selectively assembled from select access policies and attributes derived from the identity configuration based on the identity of the principal, the identity of the resource, and the identity of the desired service being used by the principal for accessing the service. Moreover, it should be noted that in some embodiments, the number of select access policies and attributes can be a single access policy and attribute. A mapping of the security contract to the principal, resource, and service is maintained by the processing for as long as a session with the principal remains active, valid, or otherwise uncompromised.

Next, an access statement is generated for the principal that maps to the security contract. The access statement does not include the security contract itself, but does include information that can be used by the processing to reproduce the principal's identity information, which is then used for re-acquiring the security contract when needed.

At 140, the access statement is transmitted back to the principal for use by the principal in authenticating itself to the desired service. In one embodiment, at 141, the access statement is transmitted as a SAML assertion, which a SAML interface of the service uses to later re-authenticate the principal with the processing. In another embodiment of 141 the access statement is transmitted as a SAML artifact. The artifact does not include the principal's identity information; rather, the artifact is random data, such as a random number, that is known only to the processing. The artifact is detected by a SAML interface of the service and provided by the service to the processing for later authenticating the principal. With embodiments that do not deploy SAML or Liberty techniques, the access statement may be the identity information of the principal.

Moreover, and optionally at 140, the access statement can include randomly generated alias identity information for the principal's identity information. The alias identity information can only be associated with the principal's identity information by the processing. This provides an added level of security for the principal's identity information, since the identity information is not being exposed on transmission wires any more than is necessary to authenticate the principal and to grant the principal access to the resource via the desired service. This alias identity information can include a random password, a random principal identification, or a random identification and password combination. Any SAML assertion or artifact used with previous embodiments can include this alias identity information, rather than the true principal identity information. Alternative, if SAML or Liberty techniques are not used, the alternate access statement only can include the alias identity information.

Once the principal has the access statement, the principal transmits the access statement to the service along with an access request to perform some access operation on the resource. At this point the service sees the access statement and believes it to be a request from an authorized principal that is logged into the service. The service uses its existing interfaces to parse the identity information or alias identity information, as the case may be, from the access statement. The identity information or alias identity information is then sent by the service to the processing along with the access request.

Accordingly, at 150, the access request and the identity information or alias identity information are received by the processing. In one embodiment, the communication between the service and the processing occurs with existing Lightweight Directory Access Protocol (LDAP) commands or applications. In this way, existing services that rely on LDAP communications to access a resource can use the teachings of this invention without requiring any modifications to their existing LDAP interfaces. This can be achieved by changing the pointer in a legacy LDAP executable application to point at the processing. The existing service will need not to alter its interface commands that it used with the legacy LDAP, since the processing is designed to mimic those interfaces. As far as the service is concerned it is interacting with a legacy LDAP application to gain access to the resource in a manner that the service would typically expect. Thus, with embodiments of this invention embodiments presented herein are easily integrated into existing security systems, such that the processing is plugged into existing architectures and becomes immediately operational in order to provide the benefits presented herein.

The processing receives, at 150, from the service an access request for a service and either the alias identity information or the original identity information that is associated with the principal. At 160, the alias identity information is mapped to the principal's identity information, if necessary. The access request is then authenticated based on the identity information and the mapping to the service contract associated with the principal, the resource, and the service is re-acquired.

The access request will include some operation that the service (on behalf of the principal) desires to perform against the resource. For example, a read operation on the principal's SSN for purposes of updating another application associated with the principal's time sheet. In this example, if the service contract associated with the principal, the service, and the resource does not authorize the service (on behalf of the principal) to read the principal's SSN from the resource, then the access request will be denied. However, if the service contract does permit a selective access policy (read operation) to be performed against the resource to acquire a selective attribute (SSN), then the access request is processed against the resource.

In this way, at 170, the service is permitted to access the resource based on the strictures defined in the service contract, which includes selective access policies and attributes. In one embodiment, the processing does not even need to generate any new interfaces for accessing the resource to perform the access request on behalf of the service. For example, consider the embodiment that was presented above, where the processing pretends to the service to be a legacy LDAP interface. In this embodiment, after the processing satisfies itself that the access request conforms to the service contract; the access request is simply passed by the processing to the original legacy LDAP interface. That legacy LDAP interface then performs the access request as if it had received it directly from the service. Again, this illustrates how the teachings of this invention are easily integrated and can become immediately operational within existing security network systems.

At 180, and with some embodiments, the processing is also configured to detect when a session with the principal has been terminated. Termination can occur based on a number of configurable events that the processing is designed to recognize. For example, if there is no activity with the principal for a defined period of time, then an event can be raised indicating that the session with the principal is to be terminated. Alternatively, if the principal affirmative logs out of an application that interfaced with the processing, then this can be raised as an expiring or terminating event. Thus, in embodiments where the principal used a browser to establish a session with the processing and the principal closes the browser or the browser terminates abnormally, then an event can be raised to indicate to the processing that the session has expired. Upon expiration of the session, the service contract becomes invalid and any subsequent attempt made by the service to use access the resource on behalf of the principal will be denied.

In other embodiments, the session with the principal can be used by the principal to streamline the processing for subsequent requests to use other services, or to use a same service associated with a current session but requiring a different access request against the resource. For example, suppose the principal has an active session with the processing and desires to access a different service for a different access request against the resource. In this situation, the processing has already authenticated the principal and has already generated an aggregated identity configuration for the principal, thus the processing derives a new instance of a service contract for the new service on behalf of the principal.

Figure 2:
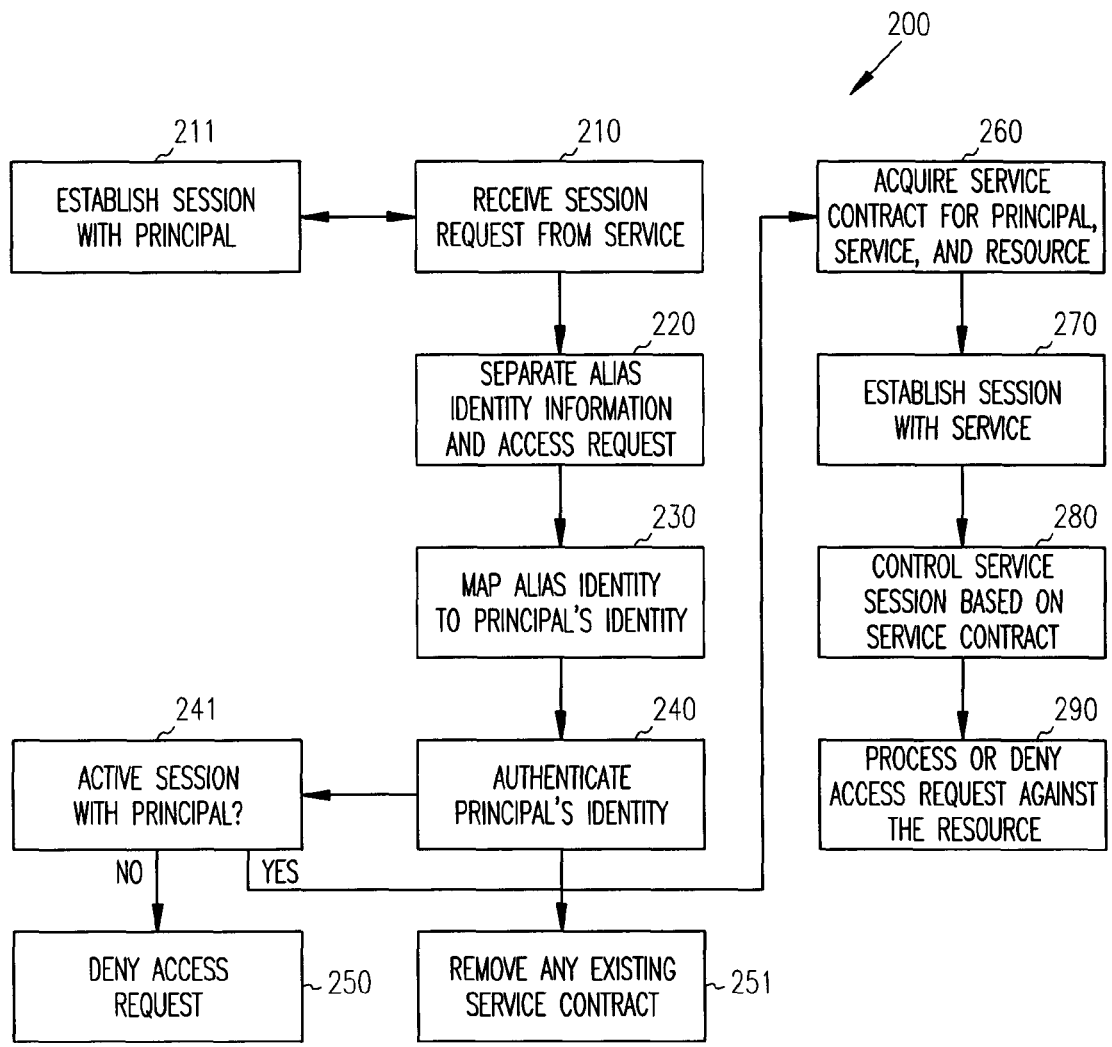
FIG. 2 is a flowchart representing another method for enforcing policy and attribute based access to a resource.

FIG. 2 is a flowchart representing another method 200 for enforcing policy and attribute based access to a resource. The method 200 is implemented in a computer-accessible or readable medium as one or more applications. In one embodiment, the processing of the method 200 (hereinafter referred to as "the processing") is implemented as a portion of a proxy server.

At 210, the processing receives a session request from a service. The session request includes an access request for accessing a resource controlled by the processing and alias identity information associated with a principal. The service is requesting the access request on behalf of the principal. In one embodiment, the processing receives the service request via LDAP commands associated with a legacy LDAP interface and the processing masquerades as if it is in fact that legacy LDAP interface, which controls the resource. Prior to receiving the session request, at 211, the processing may have previously authenticated the principal and may have previously interacted with the principal in the manner described above with respect to FIG. 1. In such circumstances, the processing need not re-perform principal authentication. In other circumstances, the processing may receive a session request where no prior interaction with or authentication of the principal has occurred. In these situations, the processing performs authentication of the principal and generates the service contract in the manner discussed above.

At 220, the processing separates the alias identity information and the access request from the session request. Next, at 230, the alias identity information is mapped to the principal's true identity information, and, at 240, the processing authenticates the principal's identity using the identity information. At 241, a check is made to determine if the principal has an active session with the processing.

If no active principal session is present, then, at 250, the access request and the associated session request are denied and at 251 if any existing service contracts associated with the principal are present, these service contracts are removed. However, if an active principal session is present, then, at 260, the associated service contract for the principal, the service, and the resource is acquired. The service contract permits the processing to establish a session with the service at 270.

The service contract is derived from an identity configuration associated with the principal. The service contract includes selective access policies and attributes, which the service can use on behalf of the principal during an active service session and as long as an active principal session is present. If an active principal session is not present, then the service contract becomes stale and is removed. Moreover, any established service session is immediately terminated when an event indicates that the principal session has expired, terminated, or has become compromised.

The access policies define operations that the service can permissibly perform on behalf of the principal against the resource. These policies also map to specific access attributes. The access attributes define specific data fields defined within the resource (e.g., SSN, IP address, and others), these data fields can be used when accessing the resource via a policy to obtain specific data values for confidential information related to the principal. The service contract represents the selective access policies and attributes derived from a principal identity configuration that the service can use against the resource.

Next, at 280, the access request originally included with the service request is compared against the service contract. In this way, at 280, the service's session with the resource via the processing is controlled by the tenets of the service contract. If the access request includes policies and attributes that are defined in the service contract, then, at 290, the processing performs the access request against the resource or alternatively passes the access request off to an existing interface of the resource for processing (e.g., legacy LDAP interface or other legacy resource interface). If the access request includes a policy or an attribute that is not defined in the service contract, then the processing notifies the service that the access request is denied or has failed.

Moreover, in some embodiments, the processing can reuse the service contract to establish multiple separate sessions with the same service or disparate services. This can occur when the principal logs into the service using multiple separate dialogues and has simultaneous communications with the service occurring in each of those separate dialogues. Additionally, so long as the processing has an active principal session with the principal, the processing can simultaneously manage separate service contracts associated with the principal but with different services.

In some embodiments, if the service is aware of the processing (e.g., the service is SAML enabled), then any provided SAML assertion can be enough to satisfy the service and no further access to access attributes is required in order for the service to satisfy itself that the principal is properly authenticated. In some these embodiments, the service may still need to gain access to access policies of the service contract. These embodiments are provided in situations where the service is provided some knowledge about the existence of the service contract, such as through a SAML assertion, which may or may not be aliased.

Figure 3:
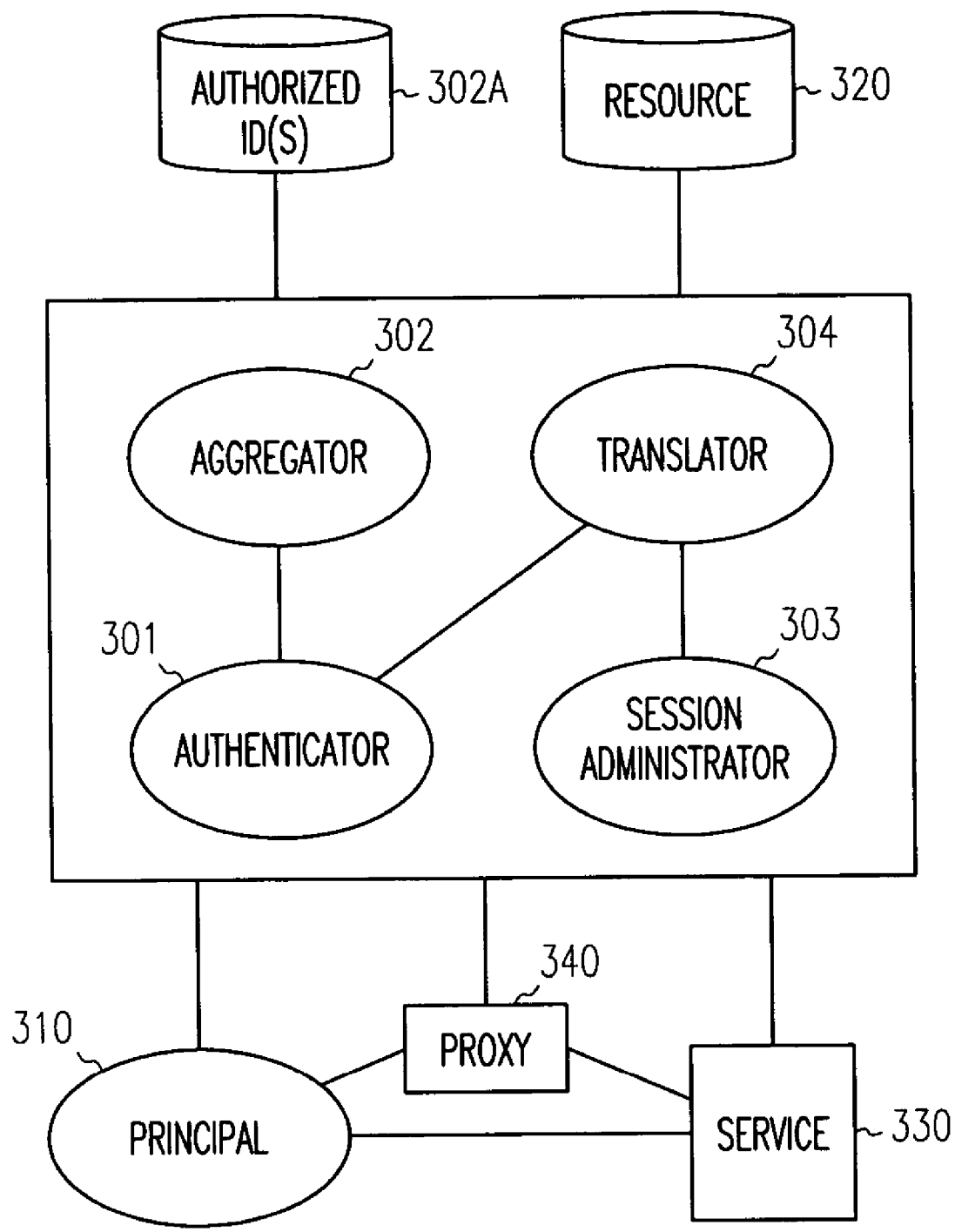
FIG. 3 is a diagram of a policy and attribute based resource access system.

FIG. 3 is a diagram of a policy and attribute based resource access system 300. FIG. 3 includes other components that interface with the system 300. The system 300 is implemented in a computer-accessible or computer-readable medium. In one embodiment, the system 300 is implemented within a proxy server.

The policy and attribute based resource access system 300 includes an identity authenticator 301, an identity configuration aggregator 302, and a resource session manager 303. Optionally, in one embodiment, the policy and attribute based resource access system 300 also includes an alias translator 304.

The identity authenticator 301 communicates with a principal 310 for receiving a principal's 310 identity information. The identity authenticator 301 uses the identity information (e.g., identification, password, certificate, biometric value, etc.) for accessing the identity configuration aggregator 302 and for authenticating the principal 310 via one or more secure authoritative identity stores 302A. The identity configuration aggregator 302 uses the identity information of an authenticated principal 310 for assembling or generating an identity configuration for the principal 310.

The identity configuration identifies the various access policies, attributes, resources 320, and services 330 which are defined for the security purposes for the principal 310. This identity configuration can include operations (access policies) that are associated with attributes (data fields) included within identified resources 320. Moreover, the identity configuration also includes relationships of identified services 330. These relationships define specific access policies and attributes that specific services may use against specific resources.

The identity configuration permits the policy and attribute based resource access system 300 to efficiently and minimally access the authoritative identity stores 302A. In other words the existence and management of the identity configuration with the system, minimizes access to the authoritative identity stores 302A and permits the system to use the identity configuration for servicing a principal 310 that is communication through multiple sessions with a single service 330 or a principal 310 that is communicating through multiple sessions with disparate services 330.

Thus, derivation and maintenance of the identity configuration improves security since only a single access to the authoritative identity stores 302A is needed. This minimizes exposure of the principal's 310 security information on transmission wires between the system 300 and the authoritative identity stores 302A. Moreover, maintenance of the identity configuration improves operational efficiency of the system 300, since a single identity configuration can be used for multiple interactions occurring with and on behalf of the principal 310.

During operation of the system 300 and after a principal 310 has initially established a session with the system 300, the principal 310 is authenticated and has an established identity configuration accessible within the system 300. Any particular principal 310 interaction will be associated with a principal 310 that has requested access to a specific resource 320 via a specific service 330.

Thus, a principal 310 issues a log-in request to a service 330; the service 330 is an existing enterprise application or system that can perform specific operations (access policies) against a specific resource 320 in order to acquire specific attributes of a specific resource 320. For example, consider a service 330 that updates an enterprise's employee time sheets, such an application may need an employee's (principal's 310) SSN or employee number (attribute) in order to update an employee time data store. The application (service 330) is permitted to access an employee data store (resource 320) for acquiring SSNs (attributes) of employees (principals 310). The access policy used by the application (service 330) is a read operation performed on the employee data store (resource 320) for acquiring a SSN (attribute). This relationship for the principal 310, the resource 320, and the service 330 is directly derivable from the identities of the parties to the transaction and can be acquired based on predefined information housed in the authoritative identity stores 302A.

The principal's 310 request used for logging into a specific service 330 will therefore indirectly imply existing access policies and attributes associated with the relationship between the service 330 and the needed resource 320. Moreover, the request also adds an additional relationship, namely, the identity of the principal 310.

Initially, the log-in request is redirected by the service 330 or by an intermediary acting as filtering proxy or authenticating application or mechanism for the service 330, such as proxy 340. The manners of redirection and authentication are discussed in detail above with the discussion of FIGS. 1 and 2. Moreover, the redirected interaction occurring from the initial log-in request and back to the system 300 for purposes of initially authenticating the principal 310 is discussed in detail above with FIGS. 1 and 2.

When the system 300 receives the re-directed log-in request from the principal 310, the system 300 now knows the parties to the transaction, namely the identity of the principal 310, the resource 320, and the service 330. The system 300 also knows whether there are any existing dialogues or sessions that are active with the principal. If an existing principal 310 session does exist, then the system 300 will not need to re-authenticate the principal (via the identity authenticator 301) and will not need to re-assemble the principal's identity configuration (via the identity configuration aggregator 302). But, if the principal is requesting log-in to a new service 330, which is not being used in any active principal 310 sessions, then the identity authenticator 301 may need to alter an access statement (described above with FIGS. 1 and 2) that is generated and transmitted to the principal 310 for use when logging into the desired service 330 associated with the log-in request. This is so, because each service 330 may require different syntaxes or semantics for proper log-in. However, if one service 330 uses the same service contract as another service 330 then the same access statement can be sent without any principal 310 interaction being required.

If the principal's 310 log-in request is a first request (i.e., there is no active session between the system 300 and the principal 310), then the system 300 creates a principal session (via the identity authenticator 301), assembles a principal's 310 identity configuration (via the identity configuration aggregator 302 and the authoritative identity stores 302A).

Next, based on the identity of the parties associated with the log-in request, the system derives a service contract for the principal 310, the resource 320, and the service 330 (the parties). The service contract includes selective access policies and attributes which may be permissibly used by the parties during any transactions which occur while the principal 310 is logged into the service 330. The service contract is maintained within the system 300 and not exposed to the principal 310 or the service 330 over any communication wires.

At some later point in time, the principal 310 will issue an access request to the service 330 for purposes of performing some operation that may be required against the resource 320 to obtain or alter an attribute within the resource 320. The access statement which was provided by the system to the principal 310 after successful authentication is included with the access request that the principal 310 issues to the service 330. The service 330, or an application acting as an interface to the service 330 (e.g., HTTP proxy 340), parses the access request, obtains the access statement, and identities a principal's 310 identifying information. In some embodiments, as was described above with FIGS. 1 and 2, this identifying information can be and assertion, an artifact, an alias embedded in an assertion or artifact, original principal identity information, or aliased principal identity information. When the service 330 receives an access request it validates that the principal 310 making the request has been authenticated to make that access request, based on the fact that the service 330 has been contacted and it resides in a secure network environment, where log-in is handled by other interfaces of the service 330 or an intermediary (e.g., HTTP proxy 340). Thus, as far as the service is concerned there is an authenticated principal 310 making an access request that requires some operation against the resource 320.

Accordingly, the service 330 uses its existing interfaces for contacting and communication with the resource 320 (e.g., legacy LDAP interface) and issues the proper commands to that existing interface along with the principal's 310 identity information (can be aliased), as the service 330 would normally do. However, pointers to these existing interfaces are altered unknown to the service 330 to point to a resource session administrator 303 of the system 300. In cases where the service 330 is SAML enabled, the service 330 can directly receive the SAML assertion and need not go through the feigned pointer to properly reach the resource session administrator 303. But, even in this case, an alias can still be embedded in the SAML assertion.

The resource session administrator 303 receives the legacy commands and sends the principal's identity information (can be aliased) to a translator 304. The translator 304 determines if the received information is the original identity information or aliased identity information. If the received information is aliased, then the aliased information is mapped to the true identity information. At this point, the true identity information can be authenticated via the identity authenticator 301. Moreover, a determination can be made as to whether the principal 310 has an active session with the system 300.

If authentication is not successful or if no active session with the principal 310 is present, then the resource session administrator 303 denies the operations being requested against the resource 320 and communicates this failure back to the session 330 using existing return codes or information that the session 330 would expect from legacy resource 320 interfaces.

If authentication is successful and an active session for the principal 310 is present, then the translator 304 acquires the service contract from the identity configuration aggregator that exists for the principal 310, the resource 320, and the service 330. The translator 304 passes the security contract to the resource session administrator 303. Next, the resource session administrator 303 inspects the operations being requested by the service 330 to determine if the identified operations and their operands are permissibly defined as acceptable access policies and attributes within the service contract. If the requested operations and their operands are not acceptable then the resource session administrator 303 denies the operations and informs the service 330.

If the requested operations and their operands are acceptable, then the resource session administrator issues the operations and operands to the resource 320 using the existing legacy interfaces which the service 330 originally believed it was using when the service 330 sent the operations and their operands. The legacy interfaces of the resource 320 then provide the results of the operations and their operands to the service 330 to complete the transaction in a manner normally expected by the service 330.

At any point during the operation of the system 300, an event may be raised within the system 300 that indicates the session with the principal has been terminated. Termination can occur for a variety of defined events, such manual session exits made by the principal 310, communication failures, application failures, hardware failures, time-outs raised by the system 300 itself, and others. When a terminating or expiring event occurs there is a potential that security of any transaction may be compromised. Accordingly, any session between the system 300 and the service 330 is immediately terminated when such an event is detected or raised within the system 300.

The architectural layout of system 300 depicted in FIG. 3 is presented for purposes of illustration only. Other configurations can exist and still perform the beneficial techniques of the system 300. For example, some architectural layouts may logically group the system 300 as a single application; other layouts may interface with external applications to the system 300 (e.g., using an authentication service for authenticating the principal's identity information), or some layouts may push some functionality to front-end interfaces that wrap around the services 330. All such modifications are intended to fall within the scope of the embodiments presented with this invention.

Figure 4:
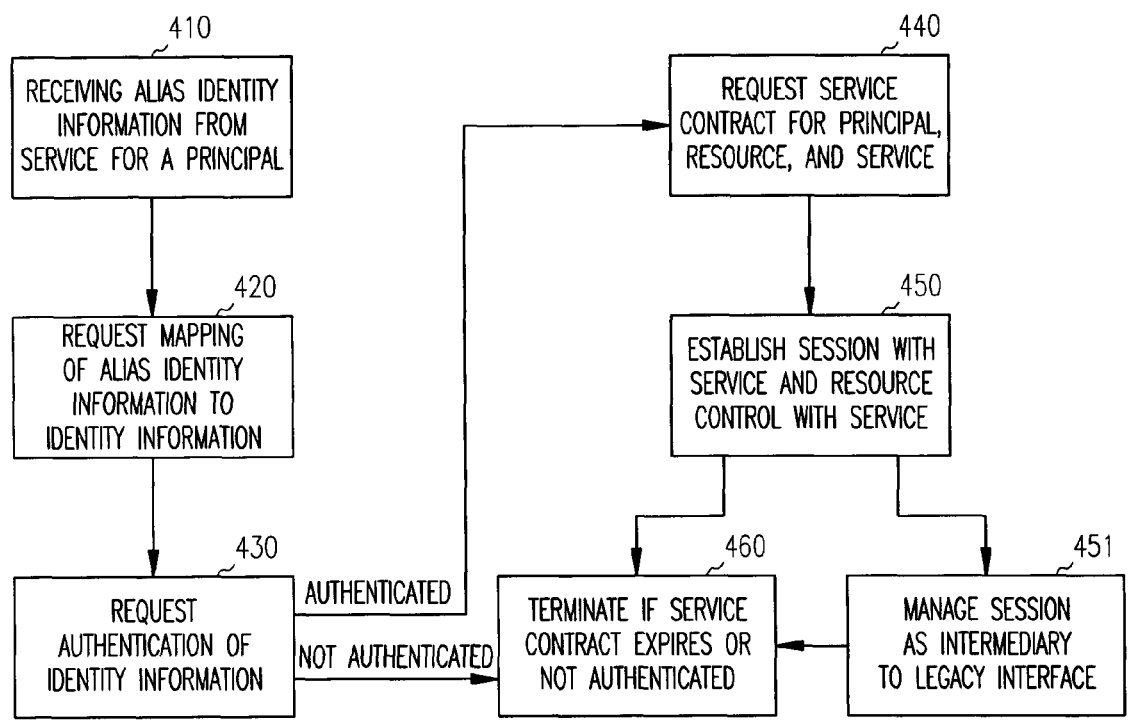
FIG. 4 is a diagram representing the processing associated with a policy and attribute based resource session manager.

FIG. 4 is a diagram representing the processing associated with a policy and attribute based resource session manager 400. The policy and attribute based resource session manager 400 is implemented in a computer-accessible or computer-readable medium. In one embodiment, the policy and attribute based resource session manager is implemented as one aspect of the resource session administrator 303 depicted with system 300 of FIG. 3. The policy and attribute based resource session manager 400 can be implemented as a single application or multiple applications that cooperate with one another to perform the instructions and processing defined below.

At 410, policy and attribute based resource session manager 400 (hereinafter referred to as "manager") receives from a service alias identity information associated with a principal. The policy and attribute based resource session manager 400 also receives one or more operations and operands from the service. The operations correspond to actions that the service wants a resource's interface to perform on its behalf against a resource, such as a read operation, a write operation, a create operation, or a delete operation. The operands correspond to the data fields contained in or to be contained (creation) in the resource that are to be obtained or written from or to.

The policy and attribute based resource session manager 400 takes the alias identity information and requests that it be mapped to true identity information associated with the principal at 420. Next, policy and attribute based resource session manager 400 takes the acquired true identity information and requests that it be authenticated at 430. If authentication is successful, then, at 440, policy and attribute based resource session manager 400 requests a corresponding service contract associated with the principal, the resources, and the service.

The requests made in the processing of 420, 430, and 440 are made to other applications or services that are designed to perform the desired operations. However, it is implicit throughout this disclosure that should authentication fail, such as at 430, processing is terminated and proper notices may be propagated to the participants. Thus, if authentication fails at 430 then processing is terminated at 460. Examples of some of these other applications are described above in detail with respect to FIG. 3 and system 300.

The service contract is derived from an identity configuration of the principal. The identity configuration includes access policies and attributes associated with the principal vis-à-vis services and resources. The service contract includes selective access policies and attributes for the principal, resource, and service relationship. The policy and attribute based resource session manager 400 derives this relationship based on the identity of the requesting service, the identity of the principal, and the identity of the needed resource that the service desires access to. Moreover, the policies define operations that are permissible against specific attributes, and the attributes define specific data fields of principal confidential information that is housed under the control of the resource. In one embodiment, the resource is a protected identity data store.

If the policy and attribute based resource session manager 400 receives verification that the principal is authenticated and that the principal has a valid session with an authentication system (such as the identity authenticator 301 of system 300), then, at 450, a service session is established between the policy and attribute based resource session manager 400 and the requesting service.

Next, again at 450, the established session is controlled according to the dictates of the acquired service contract. That is, if a service requests an operation that is not defined in the service contract, or if the service requests an operand that is not defined in the service contract, then any such requests are denied and processing terminated at 460. Acceptable operation and operand combinations which are defined in the service contract are permitted to process during the service session against the resource.

In some embodiments, the communications occurring during the service session are made in such a manner that the service believes it is communicating directly with a legacy resource interface (e.g., legacy LDAP interface). In this way, the existing communications and interfaces that legacy services use and expect can use the teachings of this invention. The policy and attribute based resource session manager 400 pretends as if it is that expected legacy resource interface, when in fact the policy and attribute based resource session manager 400 acts as an intermediary between the service and the actual legacy resource interface. Thus, in some embodiments, and at 451, the policy and attribute based resource session manager 400 manages the service session as an intermediary to a legacy resource interface. In other embodiments, where the desired session is SAML enabled, the desired service can directly communicate with the policy and attribute based resource session manager 400 and the identity of the policy and attribute based resource session manager 400 need not be feigned.

Moreover, in some embodiments, the service session is immediately terminated when an event indicates that a session with the principal has terminated, expired, or has become potentially compromised in some manner, as depicted at 460.

One or ordinary skill in the art now appreciates upon reading the above descriptions and embodiments, how confidential information involved in network transactions can be made more secure. This occurs by interposing the techniques presented herein into those transactions in order to establish security contracts between the participants in the manner described herein. Moreover, the techniques presented herein can be easily integrated with existing security architectures within little to no modification and become immediately available for use.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method implemented in a non-transitory computer-readable medium and for executing on a proxy server the method for policy and attribute based access to a resource, comprising:

receiving, at the proxy server, a session request for access to a resource, the session request is sent from a service and includes alias identity information for a principal, the alias identity information includes a random password and a random principal identification, the alias identity information is randomly generated for identity information, the identity information identifies a true identity for the principal;

mapping, by the proxy server, the alias identity information to the identity information of the principal, the identity information associated with the true identity of the principal whereas the alias identity information is the random password and the random principal identification and the identity information and the true identity of the principal is available to the proxy server but not the service or the resource;

authenticating, by the proxy server, the identity information;

acquiring, by the proxy server, a service contract for the principal, the service, and the resource, the service contract is derived from an identity configuration for the principal and the identity configuration represents aggregated access policies and attributes for the principal with respect to the resource and all known services that are available to the principal, each service is an application or system that the principal uses to gain access to the resource;

obtaining from the service contract selective resource access policies and attributes which are permissibly used by the service when accessing the resource on behalf of the principal;

defining, via the service contract, a tripartite relationship among the principal, the service, and the resource, the service contract is derived from an identity configuration of the principal, the service contract including security strictures for the tripartite relationship including the selective resource access policies and the attributes, the access policies define operations that the service can and cannot perform on behalf of the principal against the attributes of the resource the attributes define specific data fields defined within the resource;

establishing, by the proxy server, a session with the service, the session is controlled by the service contract, the service interacts through the proxy server with a Lightweight Directory Access Protocol (LDAP) legacy interface for the resource to make access requests for the principal in a format that is handled by the LDAP legacy interface and the LDAP legacy interface is not modified to handle the access requests, the access requests are in accordance with the service contract; and managing, at the proxy server, the session by acting as an intermediary between the service and the legacy LDAP interface which has access privileges to the resource.

2. The method of claim 1 further comprising accessing, by the proxy server, the identity configuration for the principal in order to acquire the selective resource access policies and attributes included within the service contract.

3. The method of claim 1 further comprising denying, by the proxy sever, access attempts made by the service during the session when the access attempts are not included within the service contract.

4. The method of claim 1 further comprising terminating, by the proxy server, the session when an event is detected that indicates the service contract is compromised or has expired.

5. The method of claim 1 further comprising establishing, by the proxy sever, the service contract with the principal prior to receiving the session request.

6. The method of claim 5 further comprising reusing, by the proxy sever, the service contract to establish one or more additional sessions with the service, wherein the one or more additional sessions are associated with one or more additional session requests made by the service.

7. The method of claim 5 wherein the establishing further includes establishing the service contract with the principal in response to a redirection operation performed by a proxy that intercepts a browser request issued from the principal to the service for purposes of accessing the resource.

8. A policy and attribute based resource session manager, residing in a non-transitory computer-accessible medium and for executing on a proxy server, comprising instructions for establishing a session with a resource, the instructions when executed performing the method of:

receiving, at the proxy server, alias identity information from a service, the alias identity information is associated with a principal, and the alias identity information includes a random password and a random principal identification, the alias identity information is randomly generated for principal identity information of the principal and the principal identity information identifies a true identity of the principal;

requesting, by the proxy server, a mapping of the alias identity information to the principal identity information, the principal identity information associated with the true identity of the principal whereas the alias identity information is the random password and the random principal identification and the principal identity information and the true identity of the principal is available to the proxy server but not the service or the resource;

requesting, by the proxy server, authenticating of the identity information; requesting, by the proxy server, a service contract for the principal, the service and a resource, the service contract includes selective resource access policies and attributes, the service contract is derived from an identity configuration and the identity configuration represents aggregated access policies and attributes for the principal with respect to the resource and all known services that are available to the principal, each service is an application or system that the principal uses for gaining access to the resource;

defining, via, the service contract a tripartite relationship among the principal, the service, and the resource, the service contract including security strictures for the tripartite relationship including the selective resource access policies and the attributes, the access policies define operations that the service can and cannot perform on behalf of the principal against the attributes of the resource the attributes define specific data fields defined within the resource;

establishing, by the proxy server, a session with the service and the resource, the session is controlled by the service contract and the service makes access requests to a Lightweight Directory Access Protocol (LDAP) legacy interface of the resource on behalf of the principal, the access requests made in a format handled by the LDAP legacy interface and the LDAP legacy interface is not modified to handle the access requests; and managing, at the proxy server, the session by acting as an intermediary between the service and the legacy LDAP interface which has access privileges to the resource.

9. The policy and attribute based resource session manager of claim 8 having instructions further comprising, permitting, at the proxy server, the service to indirectly access an identity store which represents the resource, and wherein the identity store includes secure information related to the principal.

10. The policy and attribute based resource session manager of claim 8 having instructions further comprising terminating, at the proxy server, the session when the service contract expires or is compromised.

11. The policy and attribute based resource session manager of claim 8, wherein the requesting of the mapping further includes interacting with an alias translator.

12. The policy and attribute based resource session manager of claim 8, wherein the requesting of authentication further includes interacting with an identification authenticator.

13. The policy and attribute based resource session manager of claim 8 at wherein the receiving further includes intercepting a session request that is issued from the service for the legacy LDAP interface, wherein the session request includes the alias identity information.

14. The policy and attribute based resource session manager of claim 13 having instructions further comprising managing, at the proxy server, the session with respect to the service as if the policy based resource session manager were the legacy LDAP interface.

* * * * *